Sept. 13, 1932.     A. B. HURLEY     1,877,512

METHOD OF PRODUCING NORMAL LIGHT EFFECTS

Filed Feb. 21, 1929     4 Sheets-Sheet 1

Inventor
Albert B. Hurley
By Edward E. Clement
Attorney

Sept. 13, 1932.  A. B. HURLEY  1,877,512
METHOD OF PRODUCING NORMAL LIGHT EFFECTS
Filed Feb. 21, 1929  4 Sheets-Sheet 3

Inventor.
Albert B. Hurley
By Edward E. Clement
Attorney

Sept. 13, 1932.  A. B. HURLEY  1,877,512
METHOD OF PRODUCING NORMAL LIGHT EFFECTS
Filed Feb. 21, 1929  4 Sheets-Sheet 4

Inventor
Albert B. Hurley,
By Edward C. Clement
Attorney

Patented Sept. 13, 1932

1,877,512

UNITED STATES PATENT OFFICE

ALBERT B. HURLEY, OF NEW YORK, N. Y., ASSIGNOR TO NATIONAL PAPER PROCESS COMPANY, OF NEW YORK, N. Y., A CORPORATION OF DELAWARE

METHOD OF PRODUCING NORMAL LIGHT EFFECTS

Application filed February 21, 1929. Serial No. 341,758.

My invention relates to methods for the regulation and composition of light with respect to the eye of an observer, so as to produce normal light effects thereon, which may be referred to as artificial daylight effects. The invention is based upon certain discoveries which I have made and which will be fully described hereinafter, and is closely related to the inventions described and claimed in Letters Patent heretofore granted to me as follows: No. 1,659,734, granted February 21, 1928; No. 1,659,952, granted February 21, 1928, to which the present application is closely related. This invention is also closely related to the inventions described and claimed in my prior copending applications for patent as follows: Ser. No. 43,879, filed July 15, 1925, patented June 4, 1929, Patent No. 1,715,759; Ser. No. 43,881, filed July 15, 1925.

Broadly stated, the present invention has for its object to so regulate the amount, intensity and quality of light transmitted to the eye as to relieve and prevent eye fatigue and nerve strain incident thereto. While the method involved herein and the principles upon which it is based, apply as well to transmitted light as they do to reflected light, I shall specifically describe herein the application of said method and principles to reflected light, giving sufficient directions to enable the invention to be practiced also with transmitted light.

In my prior patents and applications I have disclosed a method of modifying the light reflected from a surface by applying thereto a filter in such manner as to suppress a part of the light rays which would normally be reflected from the surface, and uniformly mingling the remaining rays, which for simplicity may be referred to as tinted rays, with a certain proportion of white light which also is uniformly distributed and remains unmodified. I have shown that not only the composition of the light reflected from the filter surfaces, but also the percentage of white light unmodified and the percentage of tinted rays reflected from the filter surfaces, are important. In these disclosures, a limited focal distance of the reflecting surface from the eye is assumed as for example, fourteen (14) inches more or less, for book or ledger paper, playing cards, and the like. In such cases the filter or screen may conveniently have dimensions similar to those of the photo-lithographers screen of sixty-five to one hundred mesh per inch. These dimensions are obviously based upon a certain visual angle. In the present case I carry this idea farther but apply the same principle of a fixed visual angle, with respect to surfaces or transmitting media at varying distances from the eye. This depends upon my discovery that light transmitted for example from a moving picture screen can be subdivided, regulated, and composed, so as to produce the same balanced effect as the eighty-five to one hundred mesh, by suitably proportioning the filtering areas and the normal or unmodified areas so that each will subtend a visual angle of approximately forty-five seconds to two minutes. Thus my broad invention is made applicable to the transmission or reflection of light from any desired media, at any desired distance.

In addition to thus regulating the amount and intensity of the light, my invention has a second most important function, in regulating the quality or character of the light, commonly referred to as the color. The eye functions most perfectly under the quality and higher intensity of daylight upon which, through countless ages, it has depended. During the past thirty years however, our eyes have been in increasing degree subjected for many hours each day to artificial illumination. During this period the electric light has been developed to its present position, as a primal artificial source, and most of our visual activities, such as reading of books or magazines, the playing of games such as cards, or the viewing of dramatic productions, and especially moving pictures, have been carried on under artificial rays produced electrically; and it can be shown that this has been accompanied by deterioration of the civilized eye, and the development of eye troubles greater and more serious than have occurred in any past generation. Even the use of candlelight, while it produced strained eyes, did not produce the violent cell changes and organic weakness which follow constant exposure to the glare and over-stimulation of present day electrical illumination. Thus, the tungsten lamp which is in universal use today, produces light which is very rich in the long wave lengths giving perception of red and yellow, which are well understood to be more fatiguing to the eye than the shorter wave lengths giving perception of blue and green. The tungsten lamp radiates one third more yellow rays than are contained in daylight, with twice as many red rays. On the other hand, daylight gives the eye ten times as many blue rays and approximately four times as many green rays, as the tungsten lamp, beside being one hundred times more intense than tungsten light. Natural illumination is intense, but owing to the coloring and distribution of natural objects, its effect is shaded, balanced, and distributed. The total illumination intensity of noon sunlight on a clear day is approximately 9,000 foot candles and on a cloudy day it might be as low as 1,500 to 2,000 foot candles, varying throughout the year. We can then estimate that during most of the day, throughout the year the total daylight illumination on surfaces not more than 25 degrees from the horizontal, would be close to 1,000 foot candles. The minimum average daylight indoors would probably be about 20 foot candles, and according to position may be several hundred foot candles. We can read a newspaper or magazine with ease and comfort under 2,000 or more foot candles of daylight, but the artificial lights used today give in more cases less than an average of 6 foot candles and we are inclined to complain of their brightness. Many who complain that the glare and intensity of artificial lights hurt the eyes, may reason that there is glare if the light source is near and not shaded, but should know that in most cases it is the quality and not the quantity of light that is causing eye fatigue and strain.

Though we cannot duplicate actual sunlight, especially as to the quantity of energy it diffuses, we can, by regulating the quality of artificially produced light, simulate the quality of sunlight and especially can correct the distorted percentages of light waves in different parts of the spectrum. This regulation is attained by suitably proportioning and tinting the light filter we employ. I shall hereinafter specifically describe the best means at present known to me in attaining this object.

In addition to regulating the amount, intensity, and quality of the light reflected or transmitted as the case may be, I find an important feature requiring attention is the relative diffusion and distribution of the light from backgrounds and objects. If we use white backgrounds for very dark details, the definition is decreased. We can make backgrounds brighter or darker than the object to be seen, but great differences in brightness cannot be tolerated in the visual field. Another important phenomenon in the practical application of my invention is that of the mutual effects of two juxtaposed colors or stimulations through simultaneous contrasts. A color is rarely seen as it actually is because of its environment. If a gray figure be placed on a green background it will appear of a pink hue. A red looks more intensely red when on a blue-green than on a yellow-orange. In the same manner where a brighter edge meets a darker one the former will appear brighter next the darker one than along the outer edge. After stimulating the retina with red light or if we look directly at an electric light filament for an instant, then fix the eye on a white surface, blue-green will appear. According to the intensity of the stimulus, light and color sensations do not reach their full and final value the instant the image is focused on the retina, nor do they decay to zero immediately upon the cessation of the stimulus. If the stimulus is bright enough the sensation "over-shoots" its value and a steady value is reached after a lapse of time (part of a second). After images are evidence that light and color sensations do not decay immediately, and according to the length of time the retina is stimulated, they may persist in our vision for some time (several minutes). Even in a reduced light the eye is subjected to retinal fatigue, especially so if exposed to a single color for some time.

In order to fully attain my objects, it is apparent that my color filter must be designed with reference to simultaneous contrasts for protection from after images. In other words, to avoid injurious interference or "over-shooting" of stimuli the value and quality must be adjusted to permit normal and rapid action of the eye functions.

Visual acuity improves or decreases with increase of brightness or illumination intensity according to the reflection factor of the background and of the object thereon. If we should choose an illumination intensity for effective vision with dark gray surroundings we would find it too great for white surfaces of 80% reflection factor. Summarizing data and laboratory tests by M. Lukeish in "Light and Work" we find that the illumination intensities of daylight character for best vision are as follows:

"For discriminating black print or detail on white backgrounds of 80% r. f., such as reading; 350 foot-candles.

For general work, assuming an average r. f. of 40%; 700 foot-candles.

For discrimination of black details on backgrounds of 20% reflection factor; 1400 foot-candles.

If seeing in shadows is important to the above an intensity of 1000 to 3000 foot-candles would be required."

Ordinarily, it is assumed that so called "white papers" reflect the full hue and value of the incident light, but if a number of white papers were directly compared a difference in hue would be easily noticed. By means of a spectre-photometer white papers and surfaces can be compared with magnesium which is supposed to reflect blue-green and red in quantities to give the sensation of pure white. Contrary to the general belief a test shows that almost all commercial white papers reflect a greater percentage of the longer wave lengths. White papers examined by the U. S. Bureau of Standards, "Technologic Paper #244," show that the average reflection of the red-green and blue was about 36–34 and 32 respectively, as compared with equal quantities reflected by magnesium. They describe a method of obtaining the color characteristics of white paper in terms of its capacity for diffusely reflecting red- ($0.62\mu$) green ($0.55\mu$) and blue ($0.46\mu$) and all papers were found deficient in the proportion of blue light reflected. Artificial lights radiate an abundance of red and yellow rays and are deficient in radiation of blue and green rays. The above papers viewed under artificial light as the tungsten light, would show a decided yellowish tinge, due to a preponderance of red and yellow rays in the light and to the paper capacity for reflecting a greater percentage of the red and yellow rays.

My invention and the discoveries upon which it is based are illustrated in the accompanying drawings in which.

Figure 1:
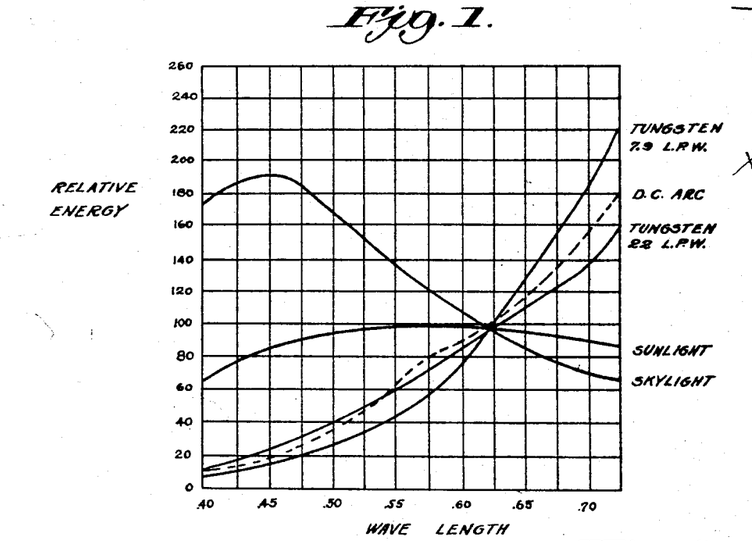
Fig. 1 is a diagram showing graphically the difference in the energy distribution of sunlight, skylight and artificial light sources.
Figures 5, 11, 12:
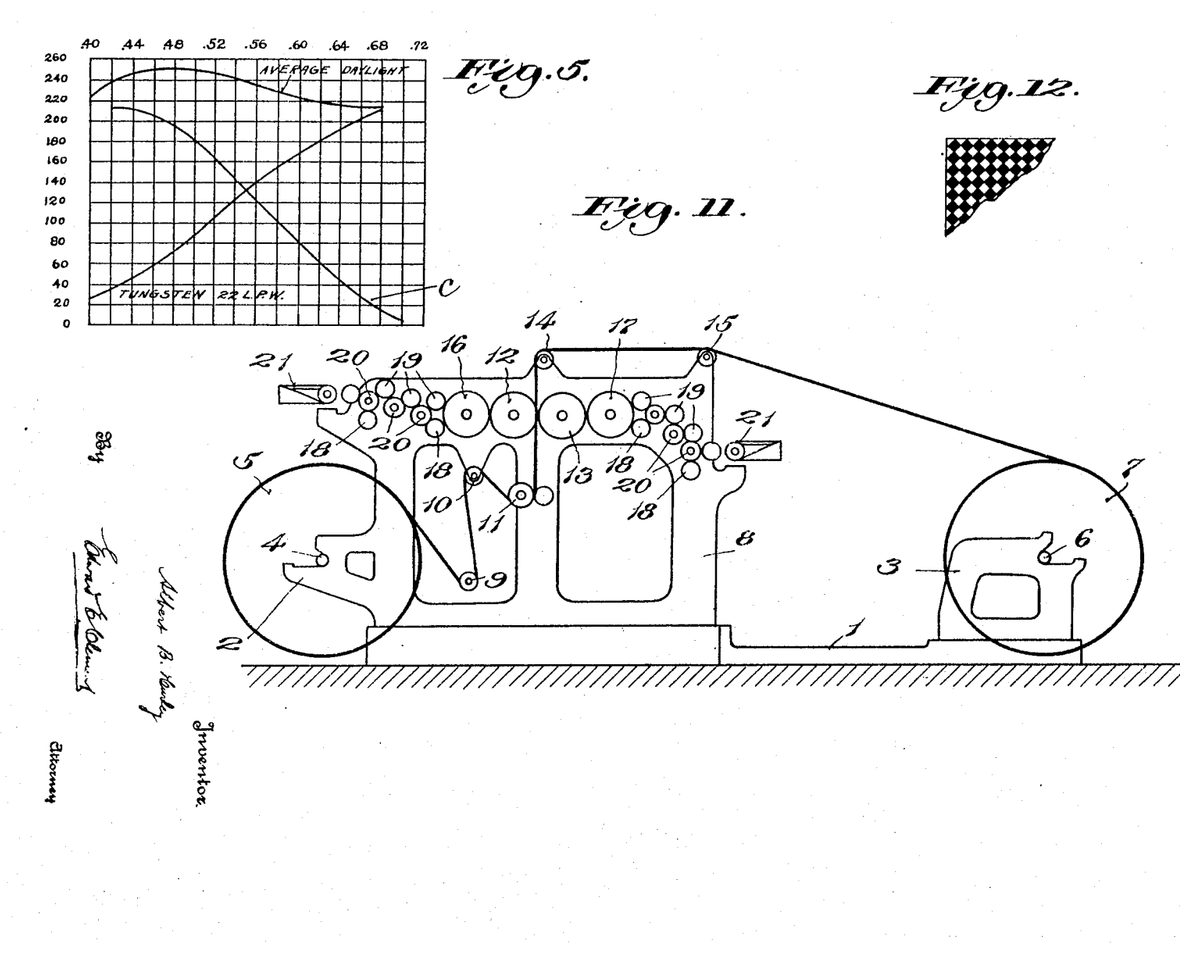
Fig. 5 is a diagram showing a curve plotted to represent average daylight, another curve plotted to represent the spectral distribution in tungsten light, and a curve plotted to show the characteristics of light which if added to the light due to the tungsten will produce composite light of the same spectral character as average daylight.
Fig. 11 is a diagrammatic side view of a machine designed to process paper according to this invention.
Fig. 12 is a fragmentary view similar to Fig. 4 showing a portion of a moving picture screen, having its area divided into diamond shaped figures with their points vertical and horizontal.

Referring to the drawings, Fig. 1 we note a great difference in the energy distribution of sunlight and skylight. North skylight and noon sunlight, however, are fairly constant in color and the average of the two would seem to be a good approximation of the term white light or daylight. To attain my object, I plot the curve of average daylight as shown in Fig. 5 and as the most common illuminant in use is the tungsten light (22 lumens per watt), its spectral distribution of energy is shown, and the curve plotted so that the energy value equals that of the daylight at the point near the limit of visibility or at wave length $0.79\mu$. Subtracting the ordinates or corresponding wave lengths of the tungsten curve from those of the daylight curve, the remainders when plotted would show curve C. This curve C is practically complementary to that of the tungsten curve and means, that if the light produced by curve C is added to the light produced by the tungsten, the total light will be of the same spectral character as average daylight. If a luminosity curve of the eye were plotted, which curve is obtained by multiplying the ordinates of the daylight and the tungsten curve by the light giving value or visibility of radiation figures, the result would show that the area under the tungsten light is approximately one half the area under daylight, which means that equal parts of the light from the tungsten and that of the spectral character of curve C must be used to produce white light. If the tungsten light used was of a lower efficiency than 22 L. P. W. a proportionate extra amount of light given by curve C would be required.

Figure 2:
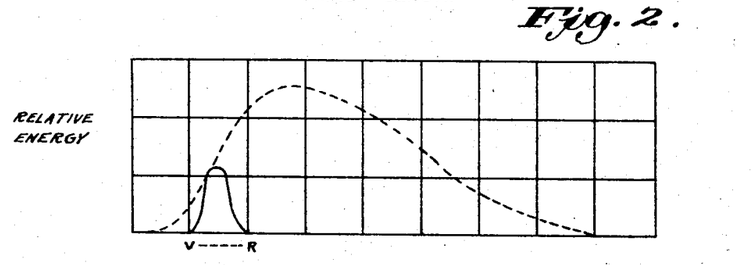
Fig. 2 is a diagram illustrating the relation between the radiation of various wave lengths and their physiologic effect in producing luminous sensation.

The relation between the radiation of various wave lengths and their physiologic effect in producing luminous sensation is shown in Fig. 2. The solid curve represents the light sensation produced by the radiant energy of the tungsten light which is shown by a broken curve. The maximum light sensation is produced by rays in the middle of the visible spectrum, and gives in this case a yellow sensation. While maximum sensibility occurs at $0.55\mu$, with uniform energy distribution in the spectrum, the wave length of maximum luminosity for most of the artificial sources of light shifts toward the red end of the spectrum, due to the preponderance of energy of the red wave lengths. Beyond the limits of the visible spectrum, Fig. 2 shows the infra-red and ultra-violet regions in which any amount of radiant energy does not give sensation of light, but the effect of these rays on the retina of the eye may be very detrimental. The retina of the eye receives and responds to radiation between limits of $0.35\mu$ and $1.0\mu$, but the radiation easily visible and not harmful lies between $0.35\mu$ in the violet and $0.77\mu$ in the red. Good visibility occurs between $0.50\mu$ and $0.60\mu$.

Figure 3A:
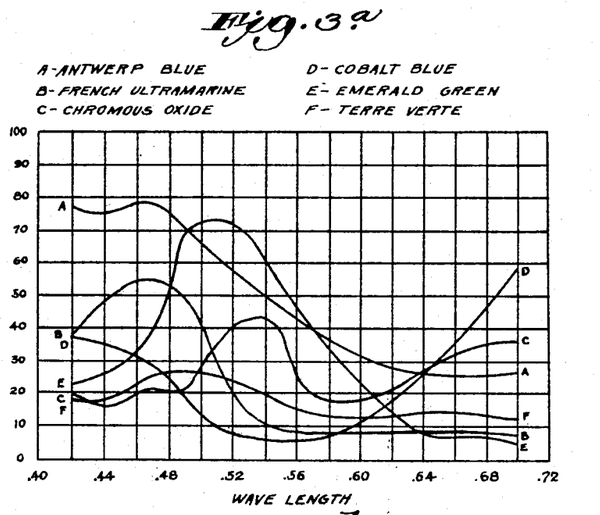
Fig. 3a is a diagram, the curves in which show the spectral analysis of a few blue and green pigments, with special reference to the application of my invention to white papers, etc.

For the purpose only of explaining clearly the application of my idea to white papers, I show by curves in Fig. 3a the spectral analysis of a few blue and green pigments. Ultra-marine is considered a close approach to spectral blue and is obtained from a mineral in various grades which are quite permanent. Cobalt blue is not a pure blue as it reflects a large proportion of deep red rays, but it is quite durable. Antwerp blue is an artificial pigment not as durable as the above but quite permanent if used alone. Emerald green is a carbonate of copper mixed with alumina and is a brilliant green color, fairly opaque. Chromium oxide is an opaque deep green pigment. Terre verte is a mineral found in various parts of Europe that is opaque and durable.

Figure 3B:
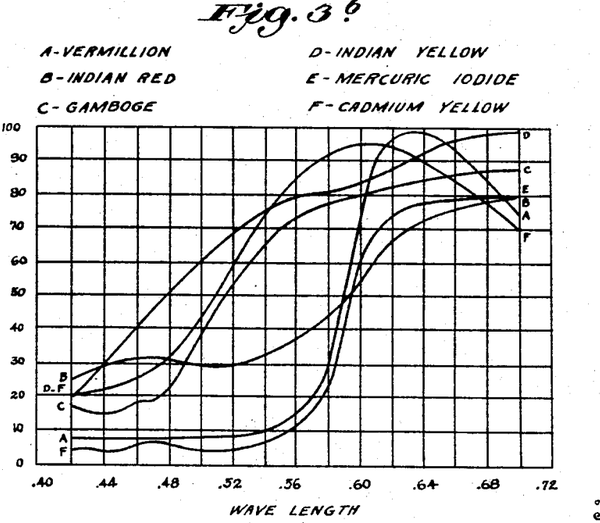
Fig. 3b is a diagram showing the spectral analysis of a few yellow and orange pigments, with special reference to the applica- are used on the projection screen under the screen.

Fig. 3b shows curves of yellow and orange pigments having similar characteristics of opacity and durability to the above, which are used on the projection screen under the high intensity arc.

Figures 4, 7:
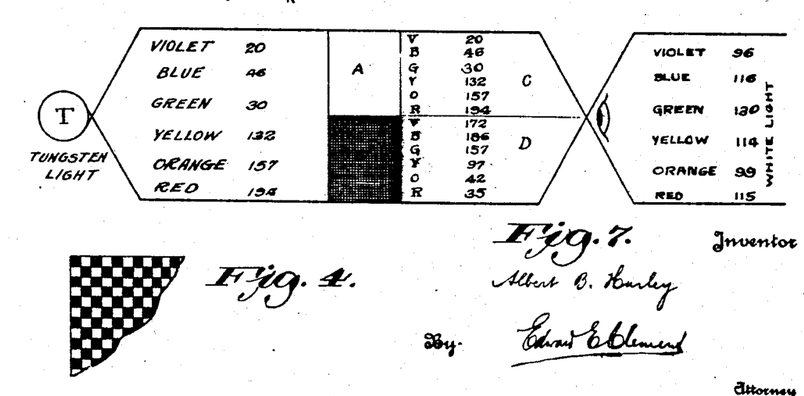
Fig. 4 represents a fragment on an enlarged scale of a surface treated by one particular application of this method.
Fig. 7 is a diagram of which one part illustrates a white surface exposed and reflecting full value of the tungsten light, and another part represents a pigment, absorbing part and reflecting part of this light.

Fig. 4 represents an enlarged fragment of a surface treated by one particular application of this method. The dimensions of each of the pigments squares, spots or figures are within certain defined limits of size, according to the reflection factor and other characteristics of the surface to be treated, and the number of these to a unit of surface determines the amount of the background surface exposed which may reflect the full hue and value of the incident light. By regulating the pigment mixture and the relative sizes of the pigment figure and the exposed surface in a unit of surface, we can regulate the amount and quality of the light reflected, and the stimulation of the eye can be increased or reduced to any desired degree, while giving perception of white light.

The chemistry of pigments is complex and many hues may be produced by mixing because pigment colors are not of spectral purity. In the present case owing to the scarcity of pure blue and green pigments (see Fig. 3a) it may be impossible to exactly duplicate the spectral character of curve C, Fig. 5, but we can obtain satisfactory results if we sacrifice the transmission of some long waves and the absorption of some short waves.

Figure 6:
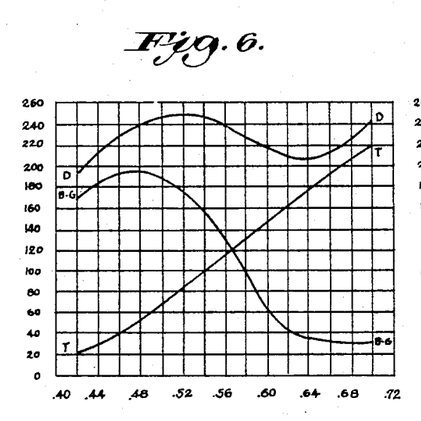
Fig. 6 is a diagram similar to Fig. 5, to illustrate the effect of sacrificing the transmission of some long waves and the absorption of some short waves.

A curve similar to C is plotted in Fig. 6, not to show a method of pigment mixture, but simply to explain this procedure. This curve B–G of a pigment to be used on the white surface mentioned in a manner heretofore explained, may be called blue-green, the curve is plotted with curve of tungsten light (22 L. P. W.) which light falls upon it, and is in part absorbed and reflected while a relative amount of white surface reflects the full value of the tungsten light. Adding the ordinates of the corresponding wave lengths of the curve B–G to that of the curve of the tungsten light the resultant as shown by curve D is comparable with the daylight curve in Fig. 5 and shows that the total light reflected from a unit of surface approximates white light. If the supposed white surface exposed did not reflect the full hue and value of the incident light the total reflection could be corrected and controlled by the pigment mixture. In this case, and instead of a curve for white which is assumed to be parallel to the base line in Fig. 6, we would plot a curve of spectral energy distribution of the particular surface and add ordinates of B–G and the tungsten curve.

Following the procedure mentioned, a unit of treated surface, enlarged, would appear as shown in Fig. 7, in which A represents the white surface exposed and reflecting full value of the tungsten light and B represents the pigment absorbing part and reflecting part of this light. In practice this unit would not be visible to the naked eye, but, from the illuminant T the eye would receive a composite of the two reflected rays C and D. The process is more simply shown by resolving into figures the relative radiant energy of corresponding wave lengths of the curve in Fig. 5. These values are given and the light from the tungsten falls first on the unit of surface A–B, then A reflects the full value as shown in C, and B reflects the values as shown in D, and the average of the two is the spectral character of the light reflected to the eye, which approximates white light. The eye will not register the separate units of light and shade but reacts to a uniformly distributed illumination or stimulation.

It must be noted that we have not added blue and green rays to the artificial light. Simply stated, we have made these particular rays more effective and stimulating by reducing the glare and over-intensity caused by a relative greater percentage of red and yellow rays.

Blue-green pigments are very satisfactory in this case because of the Purkinje effect which shows that they are of relatively greater brightness under low illumination than under high, making the process more effective under artificial light. Furthermore, the squares of pigments lower the reflection factor of the background and at the same time, by reason of their uniform shape and spacing, they diffuse the light to reduce glare. The pigment deposited on the surface will have a reflection factor of about 45% which can be varied by percentage of white mixed, and if its surface has a reflection factor of 85% the total reflection factor of the entire surface would be lowered to an average of about 65%.

In the application of the process to both sides of a paper I have found that there is a decided increase in the opacity which will permit the use of a thinner sheet of the same quality paper. The papers will be less transparent and copy of printed matter does not easily show through from the reverse side, which provides an economic feature besides being easy on the eyes.

After establishing the fact that 40% to 60% of the white surfaces should be exposed and that a pigment as shown in curve B-G Fig. 6, should be used on the white surface, we now consider the shape, size and spacing of the pigment figures. Any circumscribed figure could be used but none are as practicable as the square as this form lends itself much better to uniformity of spacing and arrangement. The size and spacing are of equal importance because the pigment squares should not be visible and their dimensions are limited by the resolving power of the eye. The uniformly arranged pigment squares and the dimension of spacing would subtend to the eye a visual angle, and all small visual angles are directly proportional to the distance from the eye, that is, an object one foot from the eye is of the same visual angle as an object twice the size at a distance of two feet. The limit of resolving power of the eye is an object so small that its image falls upon one retinal receptor, and it has been found that a normal eye cannot readily resolve two objects nearer together than about 40 seconds of visual angle which corresponds to a separation of about .0027 inch at a distance of 14 inches from the eye. (Luckeish in "Light and Work", 1924.)

I have found, however, that this visual angle varies greatly according to the percentage difference in reflection factor of the objects and the background and the intensity and character of the light used. On the surface of 80% reflection factor a pigment as mentioned having a reflection factor about 40% could be imposed in mosaic or checkered fashion and if the pigment figure or square and the related surface figure or square were each .0081 inch they would sub-tend a visual angle about two minutes and would be just beyond the limit of resolving power of the eye at a distance of 14 inches. In the specific case of white papers or surfaces to be read or viewed at the normal distance of 14 inches, a limit of coarseness of the filter or screen would be one in which the pigment squares imposed and the related exposed squares would each be about .0070 inch, subtending a visual angle of about 1 minute 45 seconds at a normal viewing or reading distance, a limit of fineness for best results being a visual angle of 45 seconds which corresponds to a pigment figure .0030 inch square uniformly spaced.

The total light reflected to the eye from this treated surface, and the mental impression received is as follows. Under ordinary daylight illumination indoors the surface appears very faintly tinted, but with a "depth" or "life" which makes the characters borne thereon assume very sharp definition. Under daylight the advantage of the treated surface lies in the reduction of glare and the lowering of the reflection factor to secure better contrast of background and character thereon. Exposed to artificial light as a nearby tungsten light, the impression of color vanishes and the mental impression is that of a pure white surface. The effect can be confirmed by holding the treated surface under test in a fixed position under high illumination and moving a perfectly white or the same untreated surface towards it. The eye at once responds to the higher stimulus, due to the increased intensity, and the mental impression of color or shade is produced by comparison with respect to the white or untreated surface. As the white surface moves away all impression of color vanishes from the treated surface and within a period of time varying with the degree of over stimulation the mental impression is again that of a pure white surface.

The physiologic effect on the eye of a white surface and a treated surface are compared. The light reflected from each surface will affect first the pupil of the eye which will tend to contract or dilate according to its brightness. Reading ordinarily involves the recognition of groups of characters as well as it does the discrimination of fine detail. The printed character is usually in black which is supposed to absorb all of the light or in a color giving such contrast that it has a low reflection factor. White papers of good quality finish, coated or machined, having a reflection factor of 80 to 85%, show too great a contrast with the character thereon. The pupil tends to contract under the brightness of the white surface but by a fatiguing muscular action adapts its adjustment with that of the lens to give the retina an image requiring fine definition. On the retina this image of a small black character or letter is defined only because of the stimulation of the retinal receptors outlining and surrounding an area of receptors or cells not stimulated. There is in most cases a spreading of this retinal image known as "irradiation" in which sharp definition is lost because the over-stimulation of the light area will spread to the dark area causing the black character to appear a diluted black or a gray, and in some cases the appearance of high lights. The same letter or character in black on a treated surface will appear more intensely black because there is approximately a 20% difference in contrast, with corresponding decrease in retinal stimulation, and in co-ordination of ciliary process.

There is another condition that affects the pupil of the eye; it is the contrast of brightness of the white surface or page of high reflection factor, with the surrounding objects, as the walls, furniture, etc. of low reflection factor averaging not more than 25%. In reading for study or recreation this successive contrast may not take place rapidly but in our work and especially in the instance of playing cards our eyes are directed at and are exposed to light reflected, first, from low reflecting backgrounds mentioned and then from a high reflecting surface. This causes pupilary adjustment according to the brightness difference and affects the ciliary process controlling the lens that may focus a blurred or indistinct image on the retina. As has been mentioned there is a time element in the co-ordination of this ciliary process because the sensation "over-shoots" and as a treated surface lessens the percentage difference in the contrast there is corresponding decrease in the range of action of this process. The white surface reflecting the full hue and value of the incident light, under tungsten or artificial light, will over-stimulate the cone cells of the retina sensitive to the longer wave lengths prevalent in this light. This is fatiguing to the eye for the cone cells are only one-fifth the number of the rod cells.

Light reflected from the treated surface will normally and evenly stimulate the rod and cone cells by a pre-determined period of vibration which will result in a normal reaction of nerves without strain. It will prevent the over stimulation of the retina which causes the sensation to "over-shoot"; lessen the effect of after images and the possibility of mistaking a printed character, letter or figure. Because of the percentage difference in stimulation of the retina the growth and decay of color sensations is helped, which saves a period between the time of first perception and the time of final conception.

Eye-strain in moving pictures may be due to several causes; flicker, lack of definition, amount and quality of light, and a too large picture, produce eye strain and though not always attributed to the projection screen they may be reduced to a minimum with the proper screen and projection apparatus.

The eye viewing a moving picture is subjected to an excessive visual fatigue and strain resulting from a prolonged observation of a highly illuminated area, occupying but a small portion of the field of view and surrounded by very dark areas. It is a common experience that under a fixed gaze the eye will become fatigued to such an extent that the detail in an object or picture will become blurred. A fixed gaze fatigues the eye very rapidly when the illumination is inadequate and of improper spectral character.

It is understood that the pupil of the eye expands and contracts in direct proportion to light intensity and in viewing moving pictures there is a constant tendency of the muscles of accommodation to follow the rapid alternation of light and darkness which sets up a terrific strain. The retina of the eye is most comfortable and perception is best at certain given light intensities which may vary slightly with the individual, but it will be found that in viewing a motion picture the pupil allows a greater proportion of light to enter than is comfortable to the retina.

Figure 8:
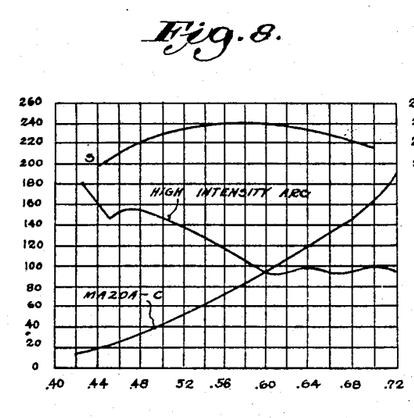
Fig. 8 is a diagram showing the difference in the quality or spectral character of the light from a high intensity carbon arc and a Mazda tungsten lamp.

There are at present only two sources of light being used in moving picture projection, the high intensity carbon arc and the Mazda C tungsten lamp. There is a very decided difference in the quality or spectral character of the light from these two sources, as shown by curves in Fig. 8, as compared with the curve of sunlight. Light from the high intensity arc is clear, more or less bluish-white, harsh, cold and brilliant light. By comparison the light from the Mazda C lamp is of a more mellow tone or quality and to the ordinary eye is by contrast a yellowish-white. The light from the high intensity arc by reason of its bluish whiteness is very penetrating and has the effect especially at high amperage of causing the white in the screen image to appear more or less chalky and unnatural.

The light from the high intensity carbon arc is the closest approach to sunlight of any artificial illumination. Quantitatively this arc gives much energy distribution in the infra-red and in the ultra-violet regions to about 0.29µ, the greatest quantity being in the short visible and near-ultra-violet region. Light from this arc is particularly harmful to the eyes and it is necessary to protect them when working near the source. This high-intensity arc is used for projecting pictures in all large theaters and in large searchlights and flood-lights.

The rays of light projected upon the screen are either reflected, absorbed or transmitted and perhaps refracted according to the nature of the screen. The most important is the amount and quality of the light reflected which depends upon (1) the molecular condition or color of the surface; (2) the angle at which the light rays are projected and reflected; (3) the wave length or spectral quality of the incident rays. The light reflected may be regular or diffused and by a proper choice and arrangement of the molecules of the surface the light rays of a desired frequency may be reflected and all other absorbed.

Figure 9:
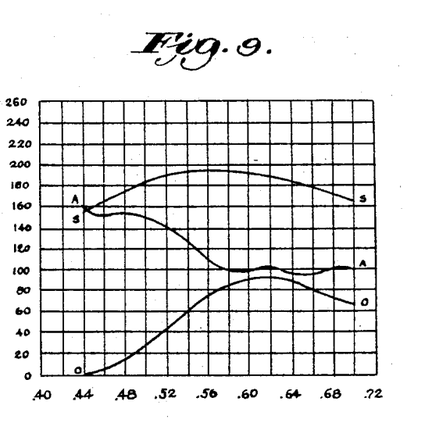
Fig. 9 is a diagram representing the spectral energy distribution of the high intensity arc used in moving picture projection, and a pigment of such a spectral character as to be used on the projection screen to produce normal light.

We can relieve to a great extent the eye strain and fatigue induced by moving pictures by an application of the idea disclosed herein. In treating a projection screen, however, we have two separate and distinct light sources of different spectral character to consider which makes it necessary to employ a different pigment mixture in each case, and the pigment figure will be considerably larger because of visual angle. In Fig. 9 curves A and S represent the spectral energy distribution of the high intensity arc and sunlight respectively, and the curves are plotted with their energy values at a point near the limit of visibility or 0.44µ. By subtracting the ordinates of A from the ordinates of S, curve O is obtained, which means that if the proper amount of light of the spectral character of O was added to the light produced by A, a light of the spectral character of S (sunlight) would be produced. A pigment of the spectral character of curve O, or one of an orange hue (Fig. 3b) would thus be used upon a white projection screen surface, if the incident light was the high intensity arc.

Figure 10:
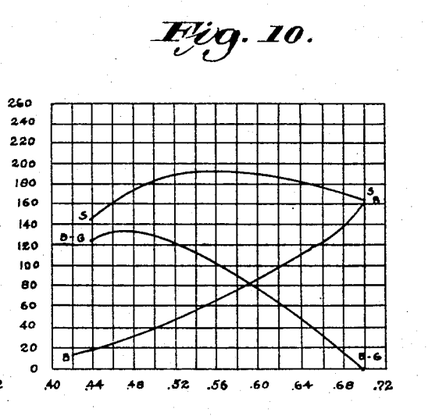
Fig. 10 is a diagram representing the spectral energy distribution of the improved Mazda C lamp.

In Fig. 10 curve B represents the spectral energy distribution of the improved Mazda C lamp used in moving picture projection. The energy value of curve B at 0.70µ is plotted to equal that of S (sunlight) at that wave length. As aforesaid, the ordinates of B are subtracted from S to obtain B–G which is complementary to B and means that a pigment of that spectral character would be used on projection screen if incident light was the Mazda C lamp. This is similar to the application of the idea to paper (see Figs. 5 and 3a), except with respect to the size of the pigment figure.

We have assumed that the projection screen surface would reflect the full hue and value of the incident light from the two sources mentioned and the curve for this surface would be a line parallel to the base line of Figs. 9 and 10. If in commercial use it is found necessary to use a surface background for the screen which does not, within limits of white, reflect the full hue and value of the incident light, the color characteristics of such surface can be corrected, and the idea maintained, by plotting the curve of its energy distribution in either Fig. 9 or 10 and adding ordinates of such curve to A and O or B–G and B respectively.

A moving picture screen may be viewed at distances varying from 20 feet to 150 feet and in a few of the larger theaters the patron may be at greater distance from the screen. The size of the pigment figure should then be calculated from the shortest distance at which the screen is viewed. The pigment should be deposited in uniform squares in mosaic or checkered fashion. Each unit (comprising one pigment figure absorbing part and reflecting part of the incident light, and the related white surface exposed and reflecting fully the incident rays) should not be visible nor readily resolved by the eyes of patrons occupying the nearest seats. The uniformly arranged pigment squares and the dimensions of spacing would then subtend to the eye at a distance of twenty feet a visual angle of about 45 seconds to 2 minutes according to brightness of illumination, the reflection factor of the screen and the hue and value of the pigment used.

Referring to Fig. 11, I have therein shown a machine designed to process paper according to the present invention. The base 1 carries vertically supported brackets 2 and 3, the first of which is provided with horizontal bearings for the shaft ends 4 carrying the mill roll of paper 5; and the second of which carries horizontal bearings for the shaft ends 6 of the rewound roll 7. The paper web passes from the roll 5 to the roll 7 through the machine, and is printed or processed in its passage with the color filter or screen heretofore described. Fig. 11 is a side view of the machine, hence all the rolls are shown in end elevation, and the side frames 8 and the brackets 2–3 are shown in outline only, so as to leave the rolls clear, whereby the passage of the paper may be traced. 9 is an equalizer roll around which the paper passes to a guide roll 10 and from this roll to a feed roll 11, whence it passes between the two offset cylinders 12 and 13; thence over the guide rolls 14 and 15 and to the rewind roll 7. It will be understood that power is applied by suitable gearing, shafting and belts, as usual, to the different rolls. As shown, the offset cylinders 12 and 13 produce the impression on both sides of the paper. These offset cylinders are of rubber or surfaced with rubber and receive their impressions from the plate cylinders 16–17 respectively. These plate cylinders have etched shells, showing the figures which are to be imprinted on the paper, as for example those illustrated in Figs. 4 and 12. They are inked through pigment rolls 18 and 19 which receive their pigment through distributing rolls 20 from the pigment vessels 21. The etched steel shells having received the ink or pigment on their surfaces transfer the same to the offset cylinders 12 and 13, which in turn as the paper passes between them, produce the requisite impressions thereon. In the machine as illustrated, if both shells 16 and 17 are supplied with pigment, the paper will be processed on both sides, which as heretofore mentioned renders it more opaque, weight for weight, than paper which has not been processed, and so enables print paper of a lighter weight to be used with great economy. It is also possible to use this machine for processing paper on one side only, by throwing out of gear the rolls 19 and 20, and removing the pigment vessel 21 or closing the same on one side. It will be understood that the desired tint or selection of spectral colors is made according to the formulas and diagrams heretofore given, and the pigment being applied to the rolls 19 and 20 and the shells 16 and 17, is carried through to the paper without change. However, it is possible to regulate this in another way. By a slight change in the machine, some or all of the rolls 19 and 20 may be supplied with pigment from different sources, the mixing of the same being done on the surface of the rolls themselves. This and other changes in details which will readily occur to those skilled in the art are within the scope of my invention, which is not limited to the specific form of machine or in fact to the specific form of grid or mixture of colors heretofore described. It is quite possible that new lights such as neon lamps or the like, may have to be taken into consideration.

In Fig. 12, I have shown a fragment of a color filter or screen somewhat similar to that shown in Fig. 4 but with the points of the figures turned vertically and horizontally, so as to form diamond shaped figures standing on their points. The purpose of this is to provide a greater lateral transmission of light rays from the screen, so as to measurably care for the fading or dimness which occurs when the observer moves around toward the side or edge of the screen. Particularly is this noticeable to the eye of an observer located to one side of the center of the screen, the white light passing at an oblique angle being apparently increased in amount. This effect can be accentuated by embossing the surface of the screen fabric so as to project either the shaded areas or the unshaded areas. It will be understood that moving picture screens and similar surfaces whatever their dimensions or intended distance from the eye of an observer, may be processed by the same machine heretofore described, or by any other suitable means. Where the fabric is heavy and the surface especially prepared for a definite rate of diffusion, it may be desirable to apply my process by means similar to decalcomania transfers. Thus, instead of processing the screen surface itself, the color filter or grid intended to be applied thereto may first be processed upon a transparent sheet or film and the latter may then be applied to the screen surfaces. Such a transparent film might remain intact on the surface, or by the decalcomania effect may be removed therefrom, leaving only the filter or screen applied to the surface.

What I claim is:

1. The method of producing a normal reflecting or transmitting surface of the type described, which consists in dividing said surface into a multiplicity of uniformly distributed circumscribed figures approximately equal in area, applying to a number of said uniformly distributed circumscribed figures a light absorbing agent of a nature that absorbs all or part of any preponderant wave lengths and reflects, or transmits, the remaining needed wave lengths of the incident light, leaving the other uniformly distributed areas exposed and reflecting, or transmitting, unchanged the hue and value of the incident light received, so as to produce a surface of uniformly distributed units, each unit comprising one absorbing area and its related normal area, reflecting, or transmitting, together a composite of wave lengths the sum of which presents to the eye white light or light within limits to which the eye can react normally and harmoniously, the size of said absorbing area and the size of the said exposed area subtending a visual angle less than that required for conscious resolution by the eye at a normal distance at which the surface is to be viewed.

2. The method of producing a normal reflecting surface of the type described which consists in dividing said surface into a multiplicity of uniformly distributed circumscribed figures approximately equal in area, applying to a number of said uniformly distributed circumscribed figures a light filter of a nature that absorbs all or part of any preponderant wave lengths and reflects the remaining needed wave lengths of the incident light, leaving the other uniformly distributed areas exposed and reflecting unchanged the hue and value of the incident light received, so as to produce a surface of uniformly distributed units, each unit comprising one filtering area and its related normal area, reflecting together a composite of wave lengths the sum of which presents to the eye white light or light within limits to which the eye can react normally and harmoniously, the size of said filtering area and the size of said exposed area being such as to subtend a visual angle less than that required for conscious resolution by the eye at the distance at which the surface is to be viewed.

3. The method of producing a surface which will reflect or transmit artificial light so as to approximate normal or sun light, which consists in producing upon said surface a color filter of uniformly distributed circumscribed areas, so as to leave corresponding uniformly distributed circumscribed areas of the natural surface exposed, said color filter having its component elements so chosen as to absorb preponderant waves in the artificial light being used, and to reflect or transmit the remaining component waves thereof, in such manner that the uniform mingling of the direct and complementary rays produces the desired effect approximating that of sun light.

4. The method described in claim 3, with the additional step of diluting the color of the filter with white to produce a balance in the synthetic effect.

5. The method described in claim 3, in which the color filter is composed of mixed pigments of pure colors, diluted with white pigment to produce such a tint as will balance the preponderant waves of the light source in the synthetic effect and have a reflection or transmission factor approximating the reflection or transmission factor of the surface exposed.

6. The method described in claim 3, with the additional step of diluting the color of the filter with white so as to make the same complementary in reflection to the uncovered portions of the reflecting surface, and thereafter further regulating the dilution with white to produce a balance in the synthetic effect with the waves derived from the source.

7. The method described in claim 3, in which the color filter is composed of mixed pigments of pure colors, diluted with white so as to be complementary to the uncovered reflecting surface, and then further diluted with white pigment to balance the preponderant waves of the light sources in the synthetic effect.

8. The method of producing a surface which will reflect or transmit artificial light so as to approximate normal or sun light, which consists in producing upon said surface a color filter of uniformly distributed circumscribed areas, leaving corresponding uniformly distributed circumscribed areas of the natural surface exposed, said color filter having its component elements so chosen as to absorb longer waves and to reflect or transmit the complementary shorter waves of a source of light other than sun light, to the extent that said short or long waves exceed in relative energy waves of a corresponding length in normal or sun light, whereby the combination of waves from the filter surfaces and from the natural or exposed surfaces will produce a synthetic light which in its combination of wave lengths will approximate normal or sun light.

9. The method of producing a surface which will reflect or transmit artificial light so as to approximate normal or sun light, which consists in producing upon said surface a color filter of uniformly distributed circumscribed areas, leaving corresponding uniformly distributed circumscribed areas of the natural surface exposed, said color filter having its component elements so chosen as to absorb shorter waves and to reflect or transmit the complementary longer waves of a source of light other than sun light, to the extent that said short or long waves exceed in relative energy waves of a corresponding length in normal or sun light, whereby the combination of waves from the filter surfaces and from the natural or exposed surfaces will produce a synthetic light which in its combination of wave lengths will approximate normal or sun light.

10. The method of producing a surface which will reflect or transmit artificial light approximating normal or sun light which consists in imposing upon said surface a color filter of uniformly distributed circumscribed areas, leaving uniformly distributed circumscribed areas of the natural surface exposed, said color filter having its component elements so chosen as to absorb light waves of a length above $.59\mu$ and to reflect or transmit light waves having a length less than $.59\mu$ whereby the light from a source rich in the long waves such as a tungsten lamp may be analyzed and synthesized so as to produce an approximation to normal or sun light.

11. The method of producing a surface which will reflect or transmit artificial light approximating normal or sun light which consists in imposing upon said surface a color filter of uniformly distributed circumscribed areas, leaving uniformly distributed circumscribed areas of the natural surface exposed, said color filter having its component elements so chosen as to absorb light waves of a length below $.59\mu$ and to reflect or transmit light waves having a length above $.59\mu$ whereby the light from a source rich in shorter waves, such as the high intensity arc, may be analyzed and synthesized so as to produce an approximation to normal or sun light.

12. The method of analyzing and synthesizing unbalanced artificial light such as that of the tungsten lamp, so as to approximate normal or sun light, which consists in producing a light filter composed of uniformly distributed circumscribed areas, leaving other uniformly distributed circumscribed areas in their natural condition, the components of said filters being such as will absorb all of the relative energy of light waves having a wave length greater than .59μ and in excess of the relative energy of the same waves in normal or sun light, the said components reflecting or transmitting all the relative energy in the light waves having wave lengths of less than .59μ all of said waves being then combined whereby the relative energy of the same respective waves in the filtered and in the unfiltered light may be combined to produce an average relative energy for each wave length approximating that in white light.

13. The method of producing normal or white light from artificial light, in which longer or shorter waves predominate, which consists in forming a filter adapted to receive and reflect or transmit a certain proportion of the light from said source, absorbing the excess relative energy of the predominating waves therein, and reflecting or transmitting direct the remaining waves unchanged, the proportions and component elements of said filter being so chosen that by synthetic combination of the energy content of the filtered and of the unfiltered waves respectively a wave band will be produced having a relative energy content for each wave length approximating that in white light.

14. The method of modifying artificial light from a source such as the tungsten lamp at 22 lumens per watt, so as to produce light approximating day light, which consists in forming a light reflecting or transmitting surface with a checkerwork or uniformly subdivided light filter upon it, such that when the energy value derived from the source equals that of the day light at a point near the limit of visibility or at wave length 0.70μ, the light reflected or transmitted by the filter may be represented by a curve whose ordinates represent the difference between the ordinates of a corresponding curve representing the tungsten light and the ordinates of a corresponding curve representing the day light, the curve of the filtered light being then practically complementary to the curve of the tungsten light, with respect to the curve of daylight, whereby the addition of the filtered light to the light produced by the source and reflected or transmitted unfiltered will produce a total light of substantially the same spectral character as average day light.

15. The method of producing a surface which will reflect or transmit artificial light so as to approximate normal or sun light, which consists in producing upon said surface a color filter of uniformly distributed circumscribed areas, leaving corresponding uniformly distributed circumscribed areas of the natural surface exposed, said color filter composed of pigments or dyes which absorb preponderant waves in the artificial light being used, and reflect or transmit the remaining component waves thereof, said pigment or dye being diluted with white pigment or dye to make it complementary in point of reflected or transmitted waves first to the uncovered surface or natural body and second to the said source being used, whereby compensation may be effected for variations in reflection or transmission by different so-called white papers or bodies, as well as for the preponderant waves from the source.

16. The method of producing a surface or body which will reflect or transmit artificial light approximating normal or sun light which consists in producing upon said surface or body a color filter of uniformly distributed circumscribed areas such as a checkerboard of squares, leaving corresponding uniformly distributed circumscribed areas of the natural surface exposed, regulating the total area of the filtered surfaces in proportion to the uncovered surfaces by reducing or increasing the filtered areas and thereby correspondingly increasing or reducing the total uncovered area, to render the filtered area complementary to the uncovered area in respect to the light waves reflected or transmitted, and diluting the tint of the filter with white so as to balance the preponderant waves of the light source in the synthetic effect.

17. The method of producing a surface or body which will reflect or transmit artificial light approximating normal or sun light which consists in producing upon said surface a color filter of uniformly distributed circumscribed areas such as a checkerboard of squares, leaving corresponding uniformly distributed circumscribed areas of the natural surface exposed, regulating the pigment or dye mixture and the relative size of the pigment figures and the exposed surface in a unit of surface, so as to regulate the amount and quality of the light reflected or transmitted, whereby the stimulation of the eye can be increased or reduced to any desired degree, while given perception of white light.

18. The method of producing a surface or body which will reflect or transmit artificial light such as tungsten light at 22 L. P. W. so as to approximate normal or sun light which consists in producing upon said surface a color filter of uniformly distributed circumscribed areas, so as to leave corresponding uniformly distributed circumscribed areas of the natural surface exposed, said color filter being produced by mixing pure pigments to reflect blue green waves, the curve of which in terms of relative energy and wave lengths has ordinates such that when added to the corresponding ordinates of the curve of the tungsten light, a curve will be produced aproximating that of day light or sun light, the total light reflected or transmitted from a unit of surface including filtered and unfiltered areas approximating white light.

19. The method described in claim 18, in which the pigment or dye mixture of the filter is varied to correct and control the total reflection or transmission in compensation for a lack of reflection or transmission of the full hue and value of the incident light by the uncolored area.

20. The method of reflecting or transmitting artificial light so as to produce an effect upon the eye approximating that of day light or sun light, which consists in producing upon a reflecting or transmitting surface a color filter of uniformly distributed and equal subdivided areas, having mixed therewith uniformly distributed subdivided exposed areas of the surface, said color filter composed of pigments or dyes mixed to produce a hue complementary to that of the artificial light reflected, which is according to the incident light and the capacity of the surface for reflecting or transmitting such light, said pigments or dyes being diluted with white pigment or dye to a tint such that when imposed on the surface in the manner stated, the total light reflected or transmitted will be just beyond the limit of color perception by the eye.

21. The method of producing approximate daylight effects by means of artificial light having a preponderance of waves in one portion of the spectrum, which consists in interposing in the path of the waves from the artificial source a medium which will absorb said preponderant waves, said medium being subdivided so that it will pass a certain percentage of the waves from the artificial source unchanged, and will mingle uniformly therewith a complementary percentage of the same waves minus the preponderant waves which have been absorbed, the relative energy percentages in the changed and unchanged waves being such that the synthetic light produced by their mingling will have a spectral character approximating white.

22. The method of producing approximate daylight effects by means of artificial light having a preponderance of waves in one portion of the spectrum which consists in interposing a reflecting surface in the path of the waves from the artificial source, said surface being subdivided into uniformly distributed circumscribed areas, with a certain uniformly distributed number of said areas carrying a filter which will absorb some of said preponderant waves and reflect other waves which will mingle uniformly with the waves reflected from the unchanged areas on the surface, said filter being composed of pure pigments diluted with white to increase the amplitude of the wave lengths and to adjust the reflection factor, said uncovered or unchanged areas having a high reflection factor, as for example 80% or more, and the filter surfaces having a reflection factor near to the reflection factor of said unchanged areas as for example 60% or more, whereby the optical effect of the synthetic waves will not only be uniform and the spectral character of the light approximately the same as daylight but an optical effect of intensity will be produced also approximating that of daylight.

23. The method of approximating daylight effects by means of artificial light which consists in interposing in the path of waves from said artificial source a medium having a normally high reflection or transmission factor for all the waves from said source, and forming on said medium a plurality of uniformly distributed circumscribed areas with a light filter applied thereto adapted to absorb preponderant waves of the artificial light and to reflect or transmit other waves thereof, the absorbing agent being composed of pigments or dyes diluted with white to increase the reflection or transmission factor to approximately the reflection or transmission factor of the exposed portions of the medium.

24. The method of producing approximate daylight effects by means of light from an artificial source giving preponderant waves in one portion of the spectrum which consists in interposing a medium divided into units, one unit passing the full value of the artificial light, and another unit treated to produce absorption of the preponderant waves and to pass the remaining waves, the light from both units being mingled and transmitted to the eye with a spectral character constituted as an average of the two, whereby the eye will not register separate units of light and shade, but will react as to a uniformly distributed illumination or stimulation.

25. The method described in claim 24, in which the absorbing agent is composed of pigments or dyes diluted with white to increase the reflection or transmission factor to approximately the reflection or transmission factor of the exposed units of the medium.

26. The method of changing the spectral characteristics of light which consists in interposing in the path of the light waves a medium divided into uniformly distributed units certain of said units being treated to absorb some of the waves from the source and to reflect or transmit other waves, the reflection or transmission factor of said units being adjusted to regulate its percentage relation to the untreated and unchanged units of the medium, all said units being so related that light will be transmitted or reflected therefrom to the eye as uniformly distributed illumination or stimulation having an average spectral character due to the uniform mingling of the filtered and the unfiltered waves.

27. The method described in claim 26, in which the artificial source employed produces a preponderance of waves having a wave length upwards of 0.59μ, such as the tungsten lamp at 22 L. P. W., and the filtering units are treated so as to absorb said preponderant long waves and to reflect the waves below 0.59μ.

28. The method described in claim 26, in which the artificial source employed produces a preponderance of waves having a wave length less than 0.59μ, such as the high intensity arc lamp, and the filtering units are treated so as to absorb said preponderant short waves and to reflect the waves above 0.59μ.

29. The method described in claim 26, in which the artificial source employed produces a preponderance of waves having a wave length upwards of 0.59μ, such as the tungsten lamp at 22 L. P. W., and the filtering units are treated so as to absorb said preponderant long waves and to reflect the waves below 0.59μ, said filtering units being treated with suitable pigments or dyes adapted to absorb and to pass the desired waves respectively, the pigments or dyes in every case being diluted with white to regulate the reflection or transmission factor.

30. The method described in claim 26, in which the artificial source employed produces a preponderance of waves having a wave length less than 0.59μ, such as the high intensity arc lamp, and the filtering units are treated so as to absorb said preponderant short waves and to reflect the waves above 0.59μ, said filtering units being treated with suitable pigments or dyes adapted to absorb and to pass the desired waves respectively, the pigments or dyes in every case being diluted with white to regulate the reflection or transmission factor.

31. The method of producing approximately day light effects with light from an artificial source, which consists in interposing in the path of said light a body capable of transmitting or reflecting light waves, and imposing on said body a checkerwork or subdivided filter capable of absorbing predominant waves in the artificial light and of reflecting waves complementary thereto, between limits of 0.35μ in the violet, and 0.77μ in the red end of the spectrum, the reflection or transmission factor of said filter being so adjusted with respect to the reflection or transmission factor of the uncovered or untreated surface of the body that the maximum relative intensity of the synthetic light produced by mingling the filtered and unfiltered waves, lies between 0.50μ and 0.60μ wave lengths.

32. The method of producing a balanced light approximating day light by the use of light from an artificial source which consists in interposing in the path of the light from said source a body capable of transmitting or reflecting the light and imposing on said body a checkerwork or uniformly subdivided filter composed of elements which by the Purkinje effect are of relatively greater brightness under low illumination than under high; said filter acting to lower the reflection factor of the background and at the same time, by reason of the uniform shape and spacing of its elements to diffuse the light to reduce glare, said reflection factor being adjusted by mixing a white element with the colored components of the filter.

33. The method of diffusing light from a surface carrying a filter as herein described, which consists in embossing said surface so as to project uniformly distributed areas thereof.

34. The method described in claim 33, in which the filter is applied to the surface in uniformly distributed, equal circumscribed areas, and the uncovered portions of the surface consisting also of uniformly distributed circumscribed areas, are embossed so as to bring forward said areas.

35. The method described in claim 33, in which the filter is applied as a checkerwork of figures standing on their points vertically, and the uncovered portions of the surface are embossed, causing them to stand out above the filter.

In testimony whereof I hereunto affix my signature.

ALBERT B. HURLEY.